United States Patent [19]
Condon

[11] 3,723,909
[45] Mar. 27, 1973

[54] DIFFERENTIAL PULSE CODE MODULATION SYSTEM EMPLOYING PERIODIC MODULATOR STEP MODIFICATION

[75] Inventor: Joseph Henry Condon, Summit, N.J.

[73] Assignee: Bell Telephone Laboratories, Incorporated, Murray Hill, N.J.

[22] Filed: June 21, 1971

[21] Appl. No.: 154,996

[52] U.S. Cl. ..........................332/11 D, 325/38 B
[51] Int. Cl. ..........................................H03k 13/22
[58] Field of Search..........332/11 R, 11 D; 325/38 B; 179/15 AP

[56] References Cited

UNITED STATES PATENTS 3,628,148 12/1971 Brolin ................................325/38 B
3,497,624 2/1970 Brolin ................................332/11 D
3,643,180 2/1972 Shimamuru et al.................332/11 D
3,354,267 11/1967 Crater .............................179/15 AP
3,452,297 6/1969 Kelly et al..........................332/11 X
3,526,855 9/1970 McDonald .........................332/11 D

*Primary Examiner*—Alfred L. Brody
*Attorney*—R. J. Guenther et al.

[57] ABSTRACT

In a differential pulse code modulation system, the integration of a pulse train representing a delta modulation coded format of an analog signal is modified by injection of at least one current of a magnitude corresponding to a predetermined fractional delta modulation step and of a polarity which indicates whether or not a delta modulation pulse was present in a predetermined phase of each recurring differential pulse code modulation accumulating period of the system. In a system coder, the initiation of the injected signal also causes the addition of a corresponding least significant bit to the accumulator output transmitted to a decoder. That least significant bit is utilized in the decoder to produce a corresponding current for injection into the equivalent integrating system of the decoder.

19 Claims, 5 Drawing Figures

INVENTOR
J. H. CONDON
BY
Charles Scott Phelan
ATTORNEY

DIFFERENTIAL PULSE CODE MODULATION SYSTEM EMPLOYING PERIODIC MODULATOR STEP MODIFICATION

BACKGROUND OF THE INVENTION

1. Field of the Invention

This invention relates to an improvement in differential pulse code modulation (hereinafter designated DPCM) systems.

2. Prior Art

Delta modulation systems are normally employed for translating analog signal information to a digital format by means of hardware which is less critical than that otherwise generally employed for analog-to-digital conversion. However, in situations where it is expected that sharp analog signal variations will be encountered, i.e., slope overdrive, it has been necessary to utilize such a high modulator sampling rate that some of the delta modulation advantage is lost because fewer signals can then be multiplexed onto a common circuit.

Differential pulse code modulation can utilize a delta modulator output by accumulating modulator output pulses over successive counting periods recurring at least at the Nyquist rate. Thus, the DPCM signal represents an analog signal sample in terms of a binary count of the number of delta modulator pulses occurring during a counting period and each indicating an analog signal increase during a delta modulator sample interval. U.S. Pat. No. 3,526,855 to H. S. McDonald is an example of such a DPCM system. The DPCM technique helps to bring the digital transmission bit rate down to a certain extent, but it still requires a relatively high delta modulator sampling rate in order to keep at a low level the noise which arises from the double sampling that is inherent in DPCM. In fact, the delta modulator sampling rate is usually so high as to make practical DPCM operation difficult.

Adaptive delta modulation (ADM) goes a long way toward meeting the slope overdrive problem that requires a high modulator sampling rate in conventional delta modulation. However, the ADM technique depends upon the utilization of a nonlinear coding technique wherein different effective modulator feedback signal step sizes are utilized for tracking the analog signal slope. This nonlinear coding requires relatively complex circuits, and the resulting ADM output signal lacks the bit group binary coded signal significance that is necessary for operation of the digital filter circuits that are appearing with greater frequency in proposals for advanced communication systems.

It is therefore one object of the present invention to improve signal modulation systems.

It is another object to reduce the delta modulator sampling rate of operation required for employment in DPCM systems.

STATEMENT OF THE INVENTION

The foregoing objects of the invention are realized in an illustrative embodiment wherein a modification is achieved in the normal integration of a delta modulation pulse train in unit steps of a polarity determined by the presence or absence of pulses in the train. That modification is periodically initiated to have a predetermined fractional-unit-step effect of a polarity tending to offset the normal unit step at the time of initiation of the modification.

It is one feature of the invention that the periodic modification is accomplished in a DPCM system at the full-count cycle rate of the DPCM counter in a DPCM coder.

It is another feature that the periodic modification of the delta modulator integration allows the modulator sampling rate to be significantly reduced without corresponding loss of signal-to-noise ratio in the output signal.

A further feature is that, in a DPCM system coder, the $2^N$th time phase, of a $2^N$-phase period in which a DPCM counter is operated over the initial $2^N-1$ phases, is utilized to initiate the modification of the delta modulator integration.

Yet another feature is that a DPCM system coder output word includes the bit-parallel output of a DPCM counter in the N−1 most significant bit positions, and includes a signal indicating the nature of the delta modulator integration modification in the least significant bit position.

An additional feature is that a DPCM system decoder has a corresponding modification of its integration initiated simultaneously with the initiation of each delta modulation pulse train part corresponding to a DPCM code word.

Still another feature is that the periodic modification always effects a fractional-step offsetting change so that the modulation noise is low in times of substantially level analog signal, when signal-to-noise ratio is normally low; and when analog signal is changing at a substantially greater rate, when signal-to-noise ratio is normally high, the periodic half-step change is effectively another noise component that is relatively suppressed.

BRIEF DESCRIPTION OF THE DRAWING

A better understanding of the invention and its various objects, features, and advantages may be obtained from a consideration of the following detailed description when taken together with the appended claims and the attached drawing in which:

DETAILED DESCRIPTION

Figure 1:
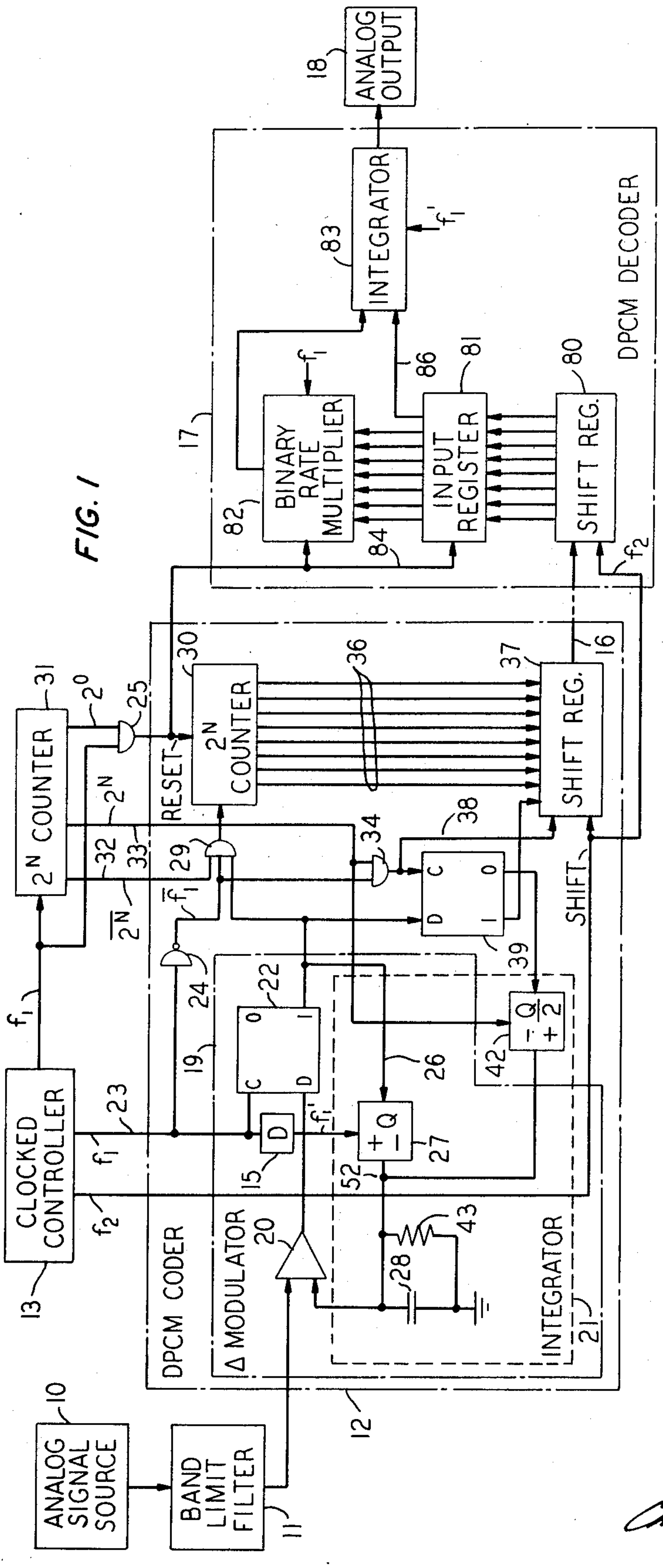
FIG. 1 is a block and line diagram of a simplified DPCM system utilizing the present invention.

In FIG. 1, the simplified illustration of a DPCM communication system is provided with analog signals from a source 10 by way of a band-limiting filter 11 which operates in the usual fashion for confining the bandwidth of the input signal to a frequency spectrum which is useful for conveying the desired information without overtaxing the capabilities of the transmission system. A coder 12 converts the band-limited analog signal into a DPCM output pulse train which comprises a sequence of binary coded count words, each of which includes an indication of the number of delta modulation pulses employed to define the nature of the analog signal over a predetermined DPCM operation interval.

The coder 12 is advantageously controlled in its operation by a system processor and clock of a type now well known in the art, and schematically represented in FIG. 1 by a clocked controller 13. The latter controller provides output signals at different frequencies but in synchronism with one another for controlling the various functions of the coder 12. The DPCM output signal word train is supplied in bit series fashion on a circuit 16 to a digital signal operation system which is not shown in detail. Such system advantageously includes, however, at least one digital filter operated on a time-shared basis with respect to binary coded signal words from a group of coders and of the type supplied by the coder 12. For example, in a telephone central office various line supervisory functions such as tone and dial pulse detection are performed by that filter.

The aforementioned DPCM count words can be applied to a decoder 17 wherein functions, which are the inverse of those performed in the coder 12, are accomplished to reproduce with substantial accuracy the analog signal originally supplied from the source 10. That signal is coupled from the receiving station 17 to an analog output circuit 18 for utilization.

Considering now in greater detail the various functions performed in the DPCM system of FIG. 1, it will be recognized that the coder 12 includes a delta modulator 19. That modulator receives the band-limited analog signal at one input to a conventional signal comparing circuit 20. The latter circuit may take any of the forms which are well known in the art and which are capable of receiving two signals at two different input connections and producing at an output connection an identifiable signal variation indicating which one of the two input signals is larger than the other one.

In the modulator 19, the comparator 20 receives at its other input connection the analog signal output of an integrator 21. Thus, whenever the input signal from source 10 exceeds in amplitude the input signal from integrator 21, the output of comparator 20 assumes a first voltage level indicating that input signal difference. When the integrator output is larger, the comparator output signal has a second voltage level. The comparator output signal is utilized for controlling a flip-flop circuit 22 of the so-called D-flip-flop type. The latter circuit is provided with periodic clock pulses at the delta modulator sampling frequency $f_1$ which are provided on a circuit 23 from the clocked controller 13. A one-half clock period delay circuit 15 couples pulses $f_1$ from circuit 23 in delayed form $f_1'$ to integrator 21.

Figure 5:
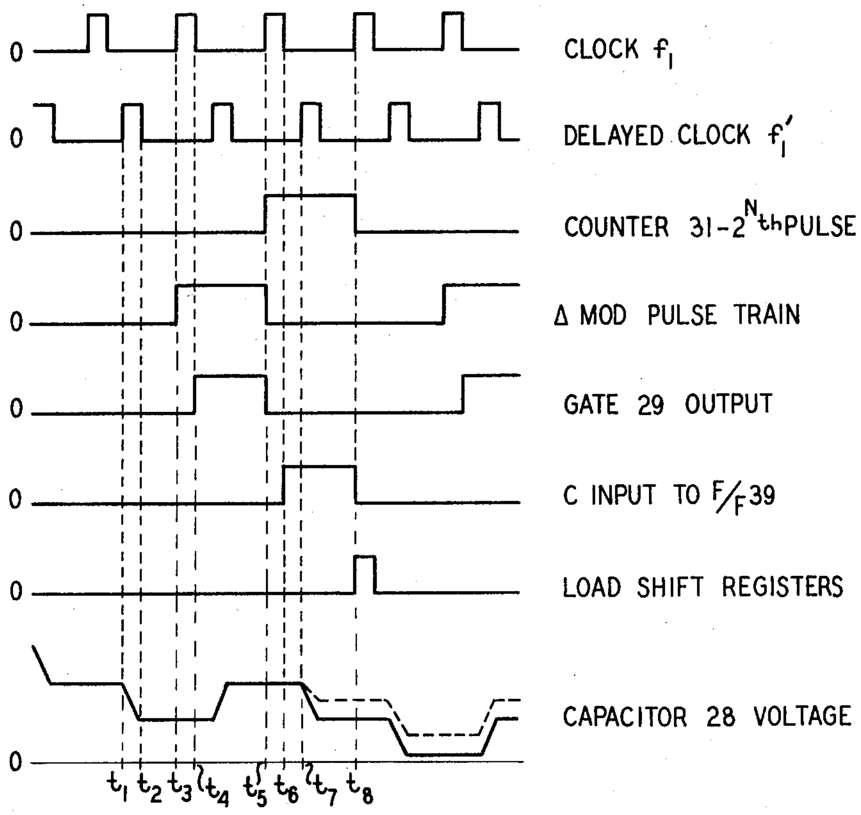
FIG. 5 is a family of timing diagrams illustrating operation of the invention.

Internal input circuits of the flip-flop 22 are arranged so that the flip-flop is sensitive to signals at its D input during only the leading edge of each clock pulse at its C input. During such time the flip-flop is established in one or the other of its stable states depending upon the level of the D-input signal and its magnitude in relation to the flip-flop circuit switching threshold. Thus, the binary ONE output of flip-flop circuit 22 comprises a train of rectangular signal excursions having a duty cycle which depends upon the character of the analog signal from source 10. This output pulse train from the flip-flop circuit 22 is the delta modulator output signal representation of the analog signal from source 10. FIG. 5, wherein all signal waves are shown with respect to a ground reference, illustrates the clock $f_1$ and the delta modulator pulse train wave diagrams. A clock pulse at time $t_3$ initiates a positive pulse in the output of flip-flop circuit 22.

A circuit 26, in the delta modulator 19, couples the output of flip-flop circuit 22 to the input of the integrator 21 for actuating a charge determining circuit 27 for controlling the charge state of an integrating capacitor 28. Circuit 27 is advantageously a current generator which applies a fixed step of charge Q to capacitor 28 with a polarity determined by the output of flip-flop 22 in each period of clock signal $f_1$. Circuit 27 is, in one embodiment, clocked by delayed clock pulses $f_1'$. One such delayed pulse is shown between times $t_1$ and $t_2$ in FIG. 5. The output of circuit 27 is positive for positive-going outputs from flip-flop circuit 22; and the output of circuit 27 is negative, to reduce charge on capacitor 28, in the absence of a positive-going pulse from the flip-flop circuit 22. FIG. 5 shows part of the voltage variations on capacitor 28 for several intervals of pulse and no pulse in the delta modulator output. Charge determining circuits of this type are known in the art, and one example thereof is shown in an article entitled "Delta Modulation for Telephone Transmission and Switching Applications" by R. R. Laane and B. T. Murphy. The article appeared at pages 1013 through 1031 in Vol. 49, No. 6 (July–Aug. 1970) of The Bell System Technical Journal. Two other embodiments of charge determining circuits will be hereinafter described in connection with FIGS. 3 and 4.

The delta modulator output pulse train is also clocked through a coincidence gate 29 to a counting input connection of a counter 30. The pulse train is divided into periods of M pulse times each, and M is advantageously $2^N$. Counter 30 is then an N-stage binary counter. N can be any real positive integer greater than one, and in the illustrated embodiment N is taken to be eight. The gate 29 is partially enabled during all outputs, except the $2^N$th output, from an additional N-stage counter 31 which is driven at the delta modulator sampling rate $f_1$ by an output of the controller 13. A further enabling signal $\bar{f_1}$ is provided through a NAND gate 24 from the $f_1$ clock lead 23. Thus, each time that the flip-flop circuit 22 in the delta modulator 19 has a positive output when the trailing edge of an $f_1$ clock pulse occurs, e.g., at time $t_4$, gate 29 has a positive-going output, as shown in FIG. 5; and the counter 30 is advanced one step.

Included in the counter 31 is count detecting logic of well-known type which applies to a circuit 32 a positive voltage during each different one of the first $2^N-1$ counts registered by counter 31 in each cycle of its operation for providing the aforementioned enabling signal to gate 29. At the end of each cycle of operation of counter 31, the $2^N$th pulse, i.e., the 256th pulse represented by the all-ZERO state of counter 31 in FIG. 1, is applied to a circuit 33 for purposes to be subsequently described. Such a $2^N$th pulse is shown at time $t_5$ in FIG. 5.

Counter 30 accumulates in binary count form the number of delta modulator output pulses in the first $2^N-1$ pulse times of a counting period. Throughout the operation of the DPCM system counter 30, the binary coded signal representation of the count is presented in bit-parallel fashion on a group of N circuits 36 which couple such representation to input connections of a shift register 37 with N+1 stages. The circuits 36 are taken from the N bit positions of counter 30 to the N most significant bit positions of register 37.

It is apparent that counter 30 is driven only to count up and then be periodically reset. Both positive-going and negative-going analog signal excursions are registered because the total count corresponds to a count in the two's complement numbering system with the sign bit inverted. This is advantageous since many digital filters such as are employed for supervisory signal processing between the coder 12 and the decoder 17 operate on a two's complement arithmetic basis. If the analog signal in a DPCM counting interval includes all negative-going excursions, there are no delta modulator output pulses and counter 30 records a count of zero. If all positive-going excursions are included, the modulator puts out a steady positive voltage and counter 30 records a count of 255. Intermediate configurations produce intermediate counts; and an analog signal that is flat, i.e., no change greater than the threshold of flip-flop circuit 22, causes the delta modulator to hunt above and below the analog level producing alternate pulse and no-pulse intervals in the output pulse train and registering a count of about 127 on counter 30.

Outputs of counter 30, operating as just described, include actual pulse count information in the seven least significant bit positions and sign information in the most significant bit position. A ninth bit is added to the counter output in a new least significant bit position, as will subsequently be described, to produce the effect of a full count potential of 256 of either polarity.

Periodically the $2^N$ pulse is provided from counter 31 on circuit 33 for enabling an AND gate 34 to couple, e.g., at time $t_6$ in FIG. 5, the inverted clock $\bar{f_1}$ to the C input of a further D-type flip-flop circuit 39 and to input gates, not separately shown, associated with the various stages of the shift register 37. Flip-flop 39 samples the output of modulator 19 during the leading edge of each $2^N$th pulse from counter 31. Those input gates admit signals from the circuits 36 and from flip-flop circuit 39 to establish those stages in binary signal conditions, corresponding to the conditions of the N least significant stages of counter 30 and the binary ONE output of flip-flop circuit 39. By the time that the 256th $\bar{f_1}$ pulse has ended, the new signal conditions have stabilized in register 37, and they are fixed there when the pulse on lead 38 ends. Thereafter, the first $f_1$ pulse of the next DPCM counting cycle begins; and gate 34 is disabled while gate 29 is enabled so that, when the inverted form $\bar{f_1}$ of that first clock time signal later arrives from gate 24 at gate 29, counter 30 is again enabled for operation. However, before such enabling takes place, counter 31 will have settled in its initial $2^0$ state in response to that first $f_1$ pulse and the gate 25 output will have reset DPCM counter 30 in anticipation of the new operating cycle.

The complement of the same output just mentioned of flip-flop circuit 39 is also utilized to initiate a modification of the operation of integrator 21 by providing a signal to an additional charge determining circuit 42. Clocking is advantageously provided in some embodiments by the $2^N$ output of counter 31 on lead 33. The circuit 42 advantageously provides an output which supplies to capacitor 28 a charge $Q/2$ which is combined in opposite sense with respect to the charge $Q$ output of the charge determining circuit 27 for $2^N$th count phase. The sense of the charge $Q/2$ output is determined by flip-flop circuit 39. Thus, if a delta modulator output pulse was present in the $2^N$th phase of a counting cycle, flip-flop circuit 39 is set and causes a binary ONE to be established in the least significant stage of register 37, and causes a negative $Q/2$ signal to be provided by circuit 42 for partially offsetting the positive $Q$ output of the circuit 27 at the same time.

The actual modification effect produced by the charge determining circuit 42 may be completed in the same $2^N$th counting phase of a DPCM counting period in which it was initiated, or it may be completed over that phase and the initial $2^N-1$ phases of the next succeeding DPCM counting period. Details of these alternate techniques for controlling circuit 42 will be hereinafter discussed with reference to FIGS. 3 and 4.

Integrating capacitor 28 in the integrator 21 is shunted by a resistor 43 in order to allow spurious capacitor charges, that may result from radiated noise in the environment, to leak off of capacitor 28 and be dissipated because they are not replaced by the charge determining circuits. This allows integrators in the coder and decoder to remain in step. In one embodiment, using a 32 kilosample DPCM word rate out of register 37, a time constant of about 200 microseconds was employed for capacitor 28 and resistor 43. Thus, the time constant of resistor 28 and capacitor 43 is usually substantially large than the DPCM counting period.

It has been found that if the delta modulator integration is periodically modified, as hereinbefore outlined in connection with the coder 12, the delta modulation sampling pulse rate $f_1$ can be approximately one-half of the rate that would otherwise be required, in order that the signal-to-noise ratio in the output signal from the coder 12 should have a suitably high value for permitting the decoder 17 to operate with a practical margin of accuracy. Although the concept of adaptive delta modulation contemplates modification of a delta modulator integration step size for avoiding analog signal slope overdrive, and although PCM systems contemplate the addition of quantizing levels in order to reduce quantizing noise in a similar vein, neither concept is directly analogous to the way in which the step size change and the DPCM output signal word size are modified in the present invention. The philosophy of these latter modifications in a DPCM system can be better understood by reference to the diagram of FIG. 2 wherein capacitor 28 charge voltage levels corresponding to DPCM pulse counts of 4, 5, and 6 are indicated at the left-hand side of the diagram.

Figure 2:
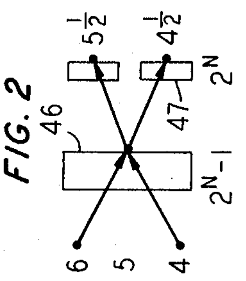
FIG. 2 is a diagram illustrating the nature of the periodic fractional step modification of a delta modulation signal integration.

It can be shown that in prior DPCM systems employing an up-down counter for generating the DPCM output word the possible error range in the final count for a cycle is two counts. This arises from the fact that the sum of the up and down counts must always be either odd or even depending upon whether the total counting phases per cycle are odd or even, respectively. A similar situation prevails when using a two's complement approach to counting. Such an error range is schematically represented in FIG. 2 by the box 46 about the count level 5 in the counting phase $2^N-1$. In the present invention the possible error range is, for analog signal portions with relatively small slope where the delta modulator hunts about the analog level, reduced by assuming that the signal direction sensed in the 255th phase will continue into the 256th phase. It is further assumed that there would be little change from the mentioned small slope so that a net modulator output signal change of only one-half the usual size is allowed to be registered for that 256th phase. The latter is accomplished by applying the usual full step and partially canceling it by a half step. Thus, in FIG. 2, the 256th phase charge and count, following a change from four to five, is a net charge to only five and one-half. Similarly if the 255th phase charge had been reduced from six to five, the 256th phase net charge is further reduced to only four and one-half. An effect of the latter type is illustrated in FIG. 5 after time $t_7$ when a clocked charge parceling system causes capacitor voltage to make a net change of only one-half step as shown by the broken-line form of the curve.

The result of the foregoing is an effective possible error range of only one count, as indicated by box 47, in the 256th phase. The term "effective" is utilized because, although that is the actual error range for the assumed, essentially flat, analog signal configuration, the possible error range for a sudden, large, signal swing is much greater. However, the latter occurrence is of relatively small consequence in a signal-to-noise ratio sense because an error of two or three in the resulting extremely small or extremely large DPCM count disappears for practical purposes upon conversion back to an analog signal.

Output information from coder 12 is supplied by shift register 37 in bit-series fashion under shift drive supplied by a pulse train $f_2$ from controller 13. The shift rate employed is determined in light of the conflicting needs for a low output word sample rate in order to make the greatest degree of time division multiplexing available in the processing circuits between coder 12 and decoder 17 and for a high output word sample rate to facilitate the construction of line filter 11. The significance of the latter factor becomes more apparent when it is realized that, for each input line that may be multiplexed into the processing equipment, a line filter and a full coder 12 (less delay 15 and gates 24 and 34) must be provided for each analog signal source. It may be noted here that filter 11 also serves to eliminate high frequency noise that, after sampling operations in coder 12 may otherwise appear within the analog signal band of interest at the output of decoder 17.

It is apparent that each count word is shifted out of register 37 in a short burst at the beginning of each new DPCM counting period. Consequently other words from other line coders, not shown, are advantageously time multiplexed onto circuit 16 before it is necessary to shift a new word out of the illustrated register 37.

Multiplexed signals on circuit 16 are demultiplexed, by circuits not shown, to allow each decoder, only the one decoder 17 being shown, to operate on signals from a single coder. In addition to the DPCM signals on circuit 16, decoder 17 receives from the controller 13 and counter 31 the clock pulses $f_1$, shift pulses $f_2$, and the reset signal from gate 25. Delayed clock pulse $f_1$ may also be provided. DPCM signals are shifted into a register 80 and then transferred in bit-parallel fashion to an input buffer register 81 by the reset signal on lead 84.

A binary rate multiplier 82 is reset at the end of each DPCM word by the signal from gate 25 so it can develop from the parallel outputs of register 81 at least an approximate form of the delta modulator output pulse train that had been produced by modulator 19. The pulse train developed is applied in bit-series fashion to an integrator 83 that is advantageously of a type at least similar to the integrator 21 in the coder. A circuit 86 advantageously couples one or more of the least significant bits in register 81 to provide supplemental control of integrator 83 in a manner similar to that exercised in the coder 12. One or more bits can be so utilized, and in the present state of the art the use of two bits has been found to represent an advantageous portion of the total that are possible. However, it is not necessary that the number of bits used in the decoder be the same as the number used in the coder.

Figure 3:
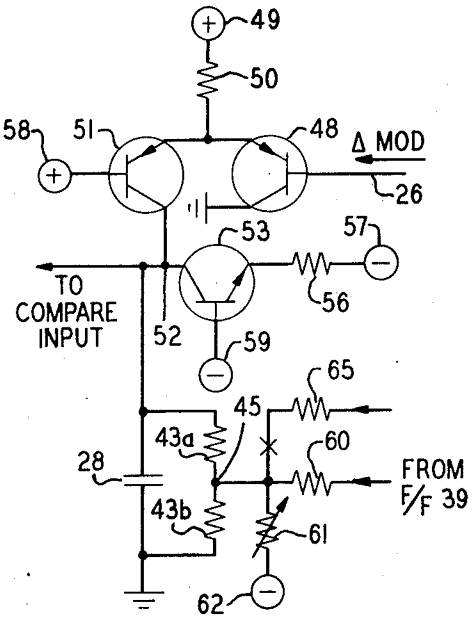
FIGS. 3 and 4 are schematic diagrams of different circuits that are advantageously employed for controlling the integration of a delta modulation pulse train in accordance with different embodiments of the present invention.

In FIG. 3 there is shown a form of integrator with charge determining circuits which combine the functions of both the Q circuit 27 and the Q/2 circuit 42 in coder 12. The same circuit is also advantageously employed for integrator 83. This circuit of FIG. 3 does not require clock control. A delta modulation type of pulse train input, e.g., such as that which would be supplied from the output of either flip-flop circuit 22 or binary rate multiplier 82 in FIG. 1, is supplied, with respect to ground, to the base electrode of a p-n-p transistor 48. That pulse train controls the current conduction level of the transistor. The collector electrode of transistor 48 is grounded, and current is supplied to the emitter electrode thereof from a source 49 of positive potential by way of a resistor 50. Source 49 is schematically represented by a circled plus sign in accordance with the usual schematic notation, whereby a circled polarity sign at a circuit point indicates the connection of a suitable potential source terminal of that polarity to that point while the source terminal of opposite polarity is connected to ground. This schematic notation is utilized throughout FIGS. 3 and 4 of the present application.

Another p-n-p transistor 51 has its emitter electrode connected to the emitter electrode of transistor 48 and has its collector electrode connected through a terminal 52, an n-p-n transistor 53 collector-emitter path, and a resistor 56 to a source 57 of negative potential. Base electrodes of transistors 51 and 53 are connected to sources 58 and 59 of positive and negative potentials, respectively. Sources 58 and 59 establish transistors 51 and 53 at fixed current conduction levels which are determined by the potentials at the emitter electrodes of the two transistors, respectively. Thus, these transistors 51 and 53 operate as current sources.

A positive delta modulation signal pulse at the base of transistor 48 biases that transistor into a nonconducting state and allows two units of current to flow in the emitter-collector path of transistor 51. One of these units of current is absorbed by the circuits of transistor 53, and the other flows into the integrating capacitor 28 to add a unit of charge Q in that capacitor. Source potential levels and transistor biasing resistors are selected so that the single unit of current has an amplitude which places the desired step charge Q on the capacitor 28 over a time interval corresponding to one clock period, e.g., $t_3$–$t_5$, in the wave diagram for the clock signal $f_1$, as shown in FIG. 5.

If the delta modulation signal applied to transistor 48 lacks a positive-going pulse, i.e., is essentially at ground potential, transistor 48 is allowed to conduct and divert the full two units of current away from transistor 51. Consequently, transistor 51 is deprived of current and falls into a nonconducting state. However, transistor 53 is still able to conduct; and, in the absence of the single unit of current which it was receiving from transistor 51, it now draws its one unit of current by discharging the integrating capacitor 28. This discharge continues for as long as the delta modulation signal remains at the low level at the base of transistor 48. It will then be seen that the charge on integrating capacitor 28 is reduced by the quantity Q during each delta modulator sampling interval when the delta modulator output signal is at a low level, and the charge is increased by a quantity *Q* during each delta modulator sampling interval when the modulator output signal is at a high level.

Still in regard to FIG. 3 the resistance 43 shunting integrating capacitor 28 to make the integrator have a leaky characteristic, as hereinbefore noted, is divided into two smaller resistors 43*a* and 43*b*, which are connected in series across capacitor 28. Resistor 43*b* is typically much smaller than resistor 43*a* and is also smaller than a further resistor 60 that is connected in series between the binary ZERO output of flip-flop 39 in FIG. 1 and a common terminal 45 in the series connection between resistors 43*a* and 43*b*. The latter two resistors have a total resistance which is equal to the resistance of resistor 43 in FIG. 1; and the resistances of resistors 43*b* and 60 are proportioned with respect to one another and with respect to output voltages available from flip-flop circuit 39, so that the current distribution pattern experienced by integrating capacitor 28 is modified to the extent of altering the charge on capacitor 28 by the quantity Q/2 during a period of time which is equal to a DPCM counting cycle for the system.

In one illustrative proportioning of circuit elements where a current of about 1 milliampere is being supplied by way of resistor 56, source 62 has an output voltage of 7.5 volts, and flip-flop 39 has outputs to resistor 60 of about 0.5 volts and 4.5 volts for its ONE and ZERO states, the elements advantageously have values as follows:

| | |
|---|---|
| Capacitor **28** | 0.02 microfarads |
| Resistor **43***a* | 10,000 ohms |
| Resistor **43***b* | 100 ohms |
| Resistor **60** | 10,000 ohms |
| Resistor **61** | 30,000 ohms |

Where the additional resistor 65 is provided, resistor 61 must be correspondingly reduced in value.

If the binary ONE output of flip-flop circuit 39 is high indicating that the delta modulator output signal is high, the current provided through resistors 60 and 43*b* from that flip-flop circuit causes the total charge on capacitor 28 to be reduced by Q/2. That reduction partially offsets the change in charge on the same capacitor that is effected by the same delta modulator signal applied to the base electrode of transistor 48. Similarly, when the flip-flop circuit 39 is producing a low output signal, the charge on capacitor 28 is increased by the quantity Q/2 for partially offsetting the decrease in that charge resulting from the same modulator signal appearing at the base electrode of transistor 48. An adjustable resistor 61 connects a source 62 of negative potential to the common terminal 45 for trimming current levels to equalize the positive and negative Q/2 effects which have just been outlined.

In the integrator 83 of decoder 17, the input to resistor 60 of FIG. 3 comes from the least significant bit position of register 81 of FIG. 1 and the input to the base electrode of transistor 48 is supplied from binary rate multiplier 82. The next least significant bit position of register 81 is also advantageously connectable directly to integrator 83, instead of through multiplier 82; and in that event the signal is supplied through a resistor 65 in FIG. 3 to the same common junction 45 for supplementing the offset effect provided in the integrator. An "X" in FIG. 3 schematically indicates the latter connection possibility, and no change in other resistors or potential sources is required when the resistor 65 connection is added. However, resistor 65, and any other similarly added resistors must be proportioned with respect to resistor 60 so that they have relative binary weighting with resistor 60 from the least significant bit position having the largest resistance.

Figure 4:
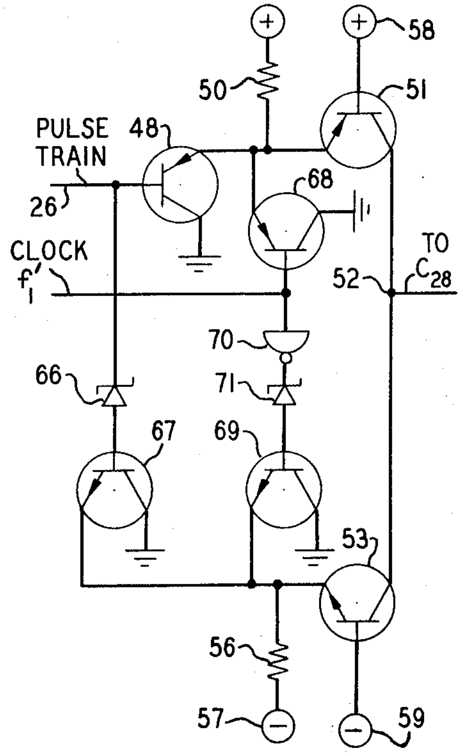

In FIG. 4 there is shown a clocked embodiment of the charge determining portion of the integrator circuit just described in connection with FIG. 3. Circuit elements in FIG. 4, corresponding to those of FIG. 3, are designated by the same or similar reference characters. Thus, in FIG. 4 the basic operation of the charge determining circuit includes a current flow of one unit through transistor 51 from circuit terminal 52 to the integrating capacitor 28. That flow occurs while transistor 53 is off. When transistor 51 is off, transistor 53 is on and a unit of current is drawn from capacitor 28 to support such conduction.

In FIG. 4, the current distribution control is exercised, by the application of pulse train signals and clock signals with respect to ground, on both the transistor 51 and the transistor 53. The delta modulation pulse train is applied to the base electrode of transistor 48, which has a common emitter electrode connection with the transistor 51 as described in connection with FIG. 3. In addition, however, the same pulse train is applied in the reverse conduction direction through a reverse breakdown diode 66 to the base electrode of n-p-n transistor 67, which has its emitter electrode connected to the emitter electrode of transistor 53. Ground is applied to the collector electrode of transistor 67. Thus, a positive pulse in the delta modulator output pulse train blocks conduction in transistor 48, and causes transistor 67 to conduct so that the drop across resistor 56 biases transistor 53 nonconducting. A ground signal in the delta modulator output pulse train biases transistor 48 for conduction and transistor 67 nonconducting.

Similarly, delayed clock signals $f_1'$ are provided by the circuit 15 as shown in FIG. 1, for controlling a p-n-p transistor 68 and n-p-n transistor 69 that share emitter electrode connections with transistors 51 and 53, respectively. Each of the transistors 68 and 69 has its collector electrode connected to ground. The base electrode of transistor 69 receives the delayed clock signals $f_1'$ by way of a NAND gate 70 and an additional reverse breakdown diode 71. Thus, in this case transistors 68 and 69 are blocked at the same times and conduct at the same times. When transistors 68 and 69 conduct in response to a ground clock signal, transistors 51 and 53 are both biased nonconducting regardless of the state of the delta modulator signal.

When a positive delayed clock pulse $f_1'$ appears, transistors 68 and 69 are biased off, as just mentioned; and the output of the delta modulator controls the charge determining circuit operation. Thus, potential sources and resistors fixing bias levels are assigned values which accomplish the desired positive or negative charge change within a clock pulse duration, e.g., $t_1-t_2$, rather than within a modulator pulse time or a counter cycle period as was the case in FIG. 3. A modulator output ground on lead 26 forces transistor 51, off as already described, and transistor 67 off. Transistor 53 then draws its one unit of current from capacitor 28 during the $f_1'$ pulse. A modulator output positive voltage allows transistor 51 to resume conduction of its one unit of current and turns off transistor 53.

From the foregoing description it should be apparent that in FIG. 4, when the delta modulator output pulse train is at ground, the capacitor voltage is reduced during each positive pulse of the clock wave $f_1'$; and when the delta modulator output pulse train is positive, the capacitor voltage increases during each such delayed clock pulse.

In the case where the Q/2 charge modification function of circuit 42 is performed by current injection at resistor 43 as shown in FIG. 3, the same type of operation is useful with the charge determining circuit of FIG. 4. Such a change takes place over a full counter period and cannot be readily illustrated in the few clock cycles that can be shown in the drawing. Otherwise, the function of circuit 42 is performed by another charge determining circuit such as shown in FIG. 3 or FIG. 4 but with circuit constants revised to provide output current at the collector electrodes of transistors 51 and 53 appropriate to accomplish the net Q/2 offset, in the proper time interval, with respect to output current at the corresponding output point from the circuit 27. In that case, the circuits share terminal 52 as indicated in FIG. 1.

Although the present invention has been described in connection with particular applications and embodiments thereof, it is to be understood that additional modifications, applications, and embodiments, which will be apparent to those skilled in the art, are included within the spirit and scope of the invention.

What is claimed is:

1. In a differential pulse code modulation coder utilizing a delta modulator and including a delta modulation output pulse counter for accumulating counts of pulses produced in sampling intervals of said modulator,
   means operating said counter over an initial M−*a* intervals of a group of M delta modulation sampling intervals, *a* and M being positive real integers at least equal to one and greater than one, respectively, and M being greater than *a*,
   said counter including means for providing a bit-parallel binary coded output signal representing the state of the counter,
   means for detecting the presence or absence of a delta modulator output pulse in *a* final intervals of said group, and
   means responsive to the output of said detecting means for adding *a* bits to the output of said counter as new least significant bit positions for representing the state of said detecting means output signal.

2. In combination,
   a delta modulator for producing, in successive modulator sampling intervals, signals indicating the present nature of an input analog signal with respect to such analog signal in a prior sampling interval, said modulator including means responsive to said indicating signals for modifying modulator operation in steps of predetermined unit size,
   means for detecting the presence or absence of an indicating signal in at least one, but much less than all, periodically recurring one of said sampling intervals, the recurrence period of said one interval being much greater than the recurrence period of said successive modulator sampling intervals, and
   means, responsive to an output of said detecting means, for effecting a change in the operation of said modifying means by a fixed portion of a unit step and completing such change prior to the next succeeding recurrence of said one sampling interval.

3. The combination in accordance with claim 2 in which
   said delta modulator includes integrating means comprising
   resistance means,
   capacitance means, and
   means connecting said resistance means and capacitance means in parallel, and
   said modifying means includes means applying said indicating signals to said integrating means.

4. The combination in accordance with claim 3 in which
   said resistance means comprises first and second resistors connected in series in the parallel connection with said capacitance means, and
   said effecting means comprises means coupling the output of said detecting means across said second resistor.

5. In a system wherein a pulse train representing a delta modulated format of an analog signal includes recurring pulse train periods each containing plural successive pulse times in which a pulse may or may not be present, and wherein the pulse train is utilized to control circuit means for reproducing such analog signal,
   means for indicating whether or not a pulse is present in said train in a pulse time near the end of each of said periods, and
   means responsive to the output of said indicating means for periodically applying to said circuit means a signal for partially modifying the signal reproducing effect of the last-mentioned pulse time of said pulse train by a predetermined fraction of such effect.

6. The system in accordance with claim 5 in which there are provided means for counting the number of pulses of said train in $2^N-1$ pulse times of each recurrent period, such period having a duration of $2^N$ pulse times, said counting means providing an N-bit output indication of its count, means for enabling operation of said indicating means during the last one of said pulse times of each period, binary rate multiplication means for converting at least a portion of said count indication into a further pulse train representing said delta modulated format, means responsive to said further pulse train for approximately reproducing said analog signal, and means responsive to an output of said indicating means in the last pulse time for modifying operation of the last-mentioned reproducing means for partially offsetting the signal reproducing effect of the last-mentioned pulse time.

7. The system in accordance with claim 5 in which means are provided for counting the number of pulses of said train in $2^N-1$ pulse times of each recurrent period, such period having a duration of $2^N$ pulse times, said counting means providing an N-bit output indication of its count, means enable operation of said indicating means during the $2^N$th one of said pulse times of each period, and means, responsive to an output of said indicating means, are provided for supplementing the output of said counting means with a new least significant bit indication corresponding to the state of said pulse train in said $2^N$th phase and making a combined (N+1)-bit count indication.

8. The system in accordance with claim 7 in which binary rate multiplication means are provided for converting at least a portion of said (N+1)-bit count indication into a further pulse train representing said delta modulated format.

9. The combination in accordance with claim 7 in which register means are provided having N+1 storage bit positions, means apply the N least significant bits of said counting means output indication to the N most significant bit positions of said register means, and said supplementing means includes means coupling said new least significant bit indication to the least significant bit position of said register means.

10. The system in accordance with claim 5 in which said pulse train is supplied by means for receiving a differential pulse code modulated signal including successive binary code words, means for converting ($M-a$) most significant bits of each of said words into a pulse sequence corresponding to a portion of said delta modulated format, $a$ being a real positive integer at least equal to one, and M being a real positive integer greater than or equal to $a$, and said indicating means comprising means, responsive to $a$ least significant bits of each of said words, for actuating said periodic applying means.

11. The combination in accordance with claim 10 in which said circuit means includes integrating means comprising resistance means, capacitance means, and means connecting said resistance means and capacitance means in parallel, and means for applying said pulse train across such parallel connection.

12. The combination in accordance with claim 11 in which said resistance means comprises first and second resistors connected in series in the parallel connection with said capacitance means, and said offsetting means comprises means for coupling the output of said actuating means across said second resistor.

13. The combination in accordance with claim 11 in which $a$ is equal to 2, and said coupling means comprises means for coupling across said second resistor a separate half-step of current of a polarity which is representative of the state of each of the two least significant bits, respectively, of each of said words.

14. The system in accordance with claim 5 in which said circuit means comprises electric current integrating means, and a bipolar current generator for supplying a fixed charge of one polarity or the other to said integrating means depending upon whether a pulse is present or absent, respectively, in each pulse time of said pulse train.

15. The system in accordance with claim 14 in which said current generator comprises a current source that is operative to either an ON or an OFF state depending upon whether or not a pulse is present in said train, and a current sink connected to both said source and said integrating means to draw current from said integrating means when said source is OFF.

16. The system in accordance with claim 14 in which said current generator comprises a pair of transistors of the same conductivity type, means connecting emitter electrodes of said transistors to a source of operating potential, means coupling to a base electrode of a first transistor of said pair to receive pulses of said pulse train for biasing said first transistor to a conducting state or a nonconducting state depending upon whether or not a pulse is present in each particular pulse time of said pulse train, means connecting a collector electrode of said first transistor to a first reference potential, means connecting a base electrode of a second transistor of said pair to a second reference potential having a potential level such that said second transistor conducts current in its emitter-collector path at a 2-current-unit level when said first transistor is in a nonconducting state and is nonconducting when said first transistor is in its conducting state, means for connecting the collector electrode of said second transistor to said integrating means, a third transistor of opposite conductivity type from said first and second transistors, means for connecting collector and emitter electrodes of said third transistor in series between a collector electrode of said second transistor and a third reference potential of lower potential magnitude than either of said first and second reference potentials, and means for connecting to a base electrode of said third transistor a fourth reference potential having a potential level such that said third transistor conducts in its collector-emitter path one unit of current from said integrating means when said first transistor is in its conducting state.

17. The combination in accordance with claim 16 wherein said current generator further comprises means receiving clock pulses at predetermined intervals, three control transistors for clocking said current generator to conduct current with respect to said integrating means only during said clock pulses, a first one of said control transistors being of the same conductivity type as said first and second transistors and having its emitter electrode connected to the emitter electrode of said second transistor and its collector electrode connected to said first reference potential, means applying said clock pulses to a base electrode of said first control transistor for biasing said such transistor into a conducting state except during each of said clock pulses, second and third ones of said control transistors each being of the same conductivity type as said third transistor and having their emitter electrodes connected to said emitter electrode of said third transistor and having their collector electrodes connected to said first reference potential, means for applying said pulse train to a base electrode of said second control transistor at a reduced voltage, and means applying said clock pulses, in inverted form, to a base electrode of said third control transistor at a reduced voltage.

18. The system in accordance with claim 16 in which said reference potentials and connecting means are proportioned to make a change of predetermined magnitude in charge in said integrating means over one of said pulse times.

19. In combination, a delta modulator for producing, in successive modulator sampling intervals, signals indicating the present nature of an input analog signal with respect to such analog signal in a prior sampling interval, said modulator including means responsive to said indicating signals for modifying modulator operation in steps of predetermined unit size, means for detecting the presence or absence of an indicating signal in at least one periodically recurring one of said sampling intervals, the recurrence period of said one interval being much greater than the recurrence period of said successive modulator sampling intervals, and means, responsive to an output of said detecting means, for effecting a change in the operation of said modifying means by a fixed portion of a unit step, and of one polarity or the other depending on whether said indicating signal was present or absent, and completing such change prior to the next succeeding recurrence of said one sampling interval.

* * * * *